US012644311B2

(12) United States Patent
Stobbe et al.

(10) Patent No.: US 12,644,311 B2
(45) Date of Patent: Jun. 2, 2026

(54) DOOR-STRIKE

(71) Applicant: Astra Gesellschaft für Asset Management mbH & Co. KG, Barsinghausen (DE)

(72) Inventors: Anatoli Stobbe, Barsinghausen (DE); Klaus Göppert-Boenke, Bad Salzdetfurth (DE)

(73) Assignee: ASTRA GESELLSCHAFT FUR ASSET MANAGEMENT MBH & CO. KG, Barsinghausen (DE)

( * ) Notice: Subject to any disclaimer, the term of this patent is extended or adjusted under 35 U.S.C. 154(b) by 110 days.

(21) Appl. No.: 18/534,050

(22) Filed: Dec. 8, 2023

(65) Prior Publication Data

US 2024/0191546 A1 Jun. 13, 2024

(30) Foreign Application Priority Data

Dec. 12, 2022 (DE) ........................ 102022132983.6

(51) Int. Cl.
*E05B 47/00* (2006.01)

(52) U.S. Cl.
CPC .. *E05B 47/0047* (2013.01); *E05B 2047/0054* (2013.01); *E05B 2047/0069* (2013.01)

(58) Field of Classification Search
CPC ............. E05B 47/0046; E05B 47/0047; E05B 2047/006; E05B 2047/0023;

(Continued)

(56) References Cited

U.S. PATENT DOCUMENTS 3,819,215 A * 6/1974 Fuss .................... E05B 47/0047 292/201
4,815,776 A * 3/1989 Fuss .................... E05B 47/0047 292/341.16

(Continued)

FOREIGN PATENT DOCUMENTS

DE 202011105510 U1 10/2012
DE 112016003432 T5 5/2018

(Continued)

OTHER PUBLICATIONS

Extended European Search Report mailed May 21, 2024 from related/corresponding European Patent Appl. No. 23215593.7.

*Primary Examiner* — Kristina R Fulton
*Assistant Examiner* — Noah Horowitz
(74) *Attorney, Agent, or Firm* — RENNER, OTTO, BOISSELLE & SKLAR, LLP

(57) ABSTRACT

The invention discloses a door opener for a door having a wing pivotally mounted to a door frame, said door opener comprising:

a main body;

a door opener latch hingedly mounted in the main body and pivotable between a closed position and an open position;

a blocking member that is displaceable from a locking position into a release position and back, the blocking member in its locking position forming a stop for the door opener latch in the closed position to prevent pivoting of the door opener latch into the open position, and the blocking member in its release position being so far offset from the door opener latch that the door opener latch may be pivoted from the closed position to the open position and back without any restriction of movement by the blocking member;

and (Continued)

an actuator coupled with the blocking member for releasing or locking the door opener latch.
The actuator comprises a motor having a rotatable shaft supporting a worm thread, and a spring member having two end portions is provided, wherein a first end portion of the spring member engages with the worm thread in order to displace the spring member linearly in the direction of extension of the rotatable shaft by rotating the worm thread, and wherein a second end portion of the spring member is coupled with the blocking member.

7 Claims, 18 Drawing Sheets

(58) Field of Classification Search
CPC ....... E05B 2047/002; E05B 2047/0031; E05B 2015/0496
See application file for complete search history.

(56) References Cited

U.S. PATENT DOCUMENTS

| | | | | |
|---|---|---|---|---|
| 5,490,699 | A * | 2/1996 | Uyeda | E05B 47/0047 292/201 |
| 5,681,070 | A | 10/1997 | Williams et al. | |
| 5,788,295 | A * | 8/1998 | Fuss | E05B 47/0047 292/341.16 |
| 5,924,750 | A * | 7/1999 | Fuss | E05B 47/0047 292/201 |
| 6,076,870 | A | 6/2000 | Frolov | |
| 6,595,563 | B2 * | 7/2003 | Kiernan | E05B 47/0047 292/201 |
| 6,634,685 | B2 * | 10/2003 | Herron | E05B 47/0047 335/262 |
| 6,874,830 | B2 * | 4/2005 | Bashford | E05B 47/0047 292/DIG. 60 |
| 7,185,928 | B1 * | 3/2007 | Liao | E05B 47/0047 292/341.15 |
| 7,540,542 | B2 * | 6/2009 | Geringer | E05B 47/0047 292/341.16 |
| 8,132,833 | B2 * | 3/2012 | Schnekenburger | E05B 65/104 292/341.16 |
| 8,833,814 | B2 * | 9/2014 | Chang | E05B 47/0047 292/341.15 |
| 9,121,198 | B2 * | 9/2015 | Gresser | E05B 47/0047 |
| 9,850,685 | B2 * | 12/2017 | Dore Vasudevan | E05B 47/0673 |
| 10,113,334 | B2 * | 10/2018 | Liao | E05B 47/0047 |
| 10,934,744 | B2 * | 3/2021 | Sims | E05B 47/0047 |
| 11,332,960 | B2 * | 5/2022 | Schildwachter | E05B 65/104 |
| 11,965,358 | B2 * | 4/2024 | Van der Wal | E05B 47/0004 |
| 2012/0006082 | A1 | 1/2012 | Peng | |
| 2012/0198897 | A1 | 8/2012 | Lui | |
| 2024/0035310 | A1 * | 2/2024 | Chibli | E05B 47/0012 |

FOREIGN PATENT DOCUMENTS

| | | | |
|---|---|---|---|
| DE | 102014104128 | B4 | 10/2018 |
| EP | 3156565 | A1 | 4/2017 |
| WO | WO2014/028332 | A1 | 2/2014 |
| WO | WO2021/148309 | A1 | 7/2021 |
| WO | WO2022/043369 | A1 | 3/2022 |

* cited by examiner

A – A a)

b)

DOOR-STRIKE

FIELD OF THE INVENTION

The invention relates to a door opener for a door having a wing pivotally mounted to a door frame, said door opener comprising:

- a main body;
- a door opener latch hingedly mounted in the main body and pivotable between a closed position and an open position;
- a blocking member that is displaceable from a locking position into a release position and back, the blocking member in its locking position forming a stop for the door opener latch in the closed position to prevent pivoting of the door opener latch into the open position, and the blocking member in its release position being so far offset from the door opener latch that the door opener latch may be pivoted from the closed position to the open position and back without any restriction of movement by the blocking member; and
- an actuator coupled with the blocking member for releasing or locking the door opener latch.

BACKGROUND OF THE INVENTION

Electrically operated door openers are well known in the art, where a door opener latch in its closed position forms a locking stop for the door bolt of a door lock and thereby locks the door securely. Such door openers require a lot of energy and thus a mains power supply that supplies a lot of power at all times. By releasing the door opener latch, said latch may pivot and thus withdraw the stop for the door bolt. Thereby, the door may be pivoted. This is particularly useful for front doors of residential buildings, in order to allow visitor access via remote control without moving the door bolt of the door lock by manipulating a key.

A corresponding door opener is described in EP 3 156 565 A1, for example. There, the locking stop for the door opener latch is embodied as a pivotally mounted latch lever which may be locked by means of a solenoid.

DE 20 2011 105 510 U1 provides a door opener having a movably mounted door opener latch, an electrically switchable locking apparatus with an electrical actuator, and a locking member controllable by means of the actuator, which operates either directly with the door opener latch or indirectly with the door opener latch via a latch lever embodied as a lever. The actuator is comprised of an electric coil, a rotating armature, and a leaf spring. When power is supplied to the electric coil, the rotating armature rotates.

WO 2020/00041 A1 and WO 2020/00040 A1 disclose a door opener comprising an electric motor as an actuator that moves a cam by rotating an output shaft, said cam having a contour for pivoting an abutting locking member. This allows the locking member to be pivoted from a release position into a locking position, thereby forming a stop for the door opener latch.

DE 10 2014 104 128 B4 discloses a tumbler for holding a door or window wing in a closed position. The door opener latch is blocked by means of a latch lever which is locked in the closed position by means of a pivotable armature. A motor is arranged underneath the latch lever and pushes the armature directly with a linear push rod.

DE 11 2016 003 423 T5 discloses an electric door opener system, where an electric motor linearly displaces a blocking member for the pivotally mounted door opener latch via a drive shaft.

On this basis, it is the object of the invention to provide an improved door opener.

SUMMARY OF THE INVENTION

The object of the invention is achieved by means of the door opener according to claim 1. Advantageous embodiments are provided in the dependent claims.

It is proposed to provide the actuator with a motor having a rotatable shaft with a worm thread, and a spring member having two end portions is provided. A first end portion of the spring member engages with the worm thread in order to linearly displace the spring member in the direction of extension of the rotatable motor shaft by rotating the worm thread. The second end portion of the spring member is coupled, directly or indirectly, with the blocking member. This allows unlocking by releasing the blocking member or directly moving the blocking member, but not by means of a directly acting actuator force. Rather, the spring element decouples the actuator and the blocking member and/or the intermediate unlocking mechanism.

This has the advantage that less electrical energy is required for operating the actuator. This allows realizing a battery-powered door opener, which may be operated by means of a battery over a plurality of years. By contrast, door openers with solenoids can hardly be operated by means of a battery due to their huge energy requirements. Door openers with a directly coupled electric motor also exhibit high power consumption, because the motor has to counteract the locking forces acting onto the blocking member and/or an intermediate unlocking mechanism. This occurs, for example, when force is applied onto the door opener latch in its locked state by means of pressure against the door, such that the door opener latch presses against the latch lever or a blocking member. Thereby the blocking member or the unlocking mechanism is no longer able to move easily due to traction or friction. For an unlocking operation, the electric motor has to overcome these additional forces.

In the present case, however, the intermediate spring member allows using the spring member as a store of energy. In order to achieve this, the electric motor only has to linearly displace the spring member without expending increased force. The spring member is thus biased and serves as a store of energy, such that at the latest a temporary release of the door opener latch, for example, when the pressure onto the door is reduced, causes the spring force to act directly upon the blocking member and thereby move said member, or to act upon an unlocking mechanism and thereby induce a movement for indirectly unlocking the blocking member. Thereby, the blocking member is moved to a temporary position (which lasts until a transition into a locked state that follows immediately after an opening phase) or permanent position (which lasts until a state change). This may be a temporary open state for opening immediately after releasing the door or a permanent open state for opening the door at an arbitrary time. This may, however, also be a temporary closed state (locked state) or a permanent closed state. In the respective open or closed state, the blocking member is displaced into the associated position and remains there without requiring to operate the actuator in the end position. Therefore, the actuator only needs to be operated briefly to displace the spring member and thereby apply a spring force that moves the blocking member into the desired position.

This allows operating the door opener in a compact and simple manner, without permanent power demand, neither in the open mode nor in the closed mode. In the open mode, the door opener latch is not blocked by the blocking member and may be pivoted freely. For this purpose, the electric motor only needs to be operated for the time period during which the spring member is being biased or moved away from the electric motor, such that the blocking member can be displaced into the release position. In the open mode, no further operation of the electric motor is required and thus no further power is consumed. In the closed mode, the door opener latch is blocked in the locked position by the blocking member. For this purpose, the electric motor only needs to be operated for the time period during which the spring member is being released or moved towards the electric motor, such that the blocking member can be displaced into the locked position, such that the door may be used unrestrictedly. In the closed mode, no further operation of the electric motor is required and thus no further power is consumed. The open mode is advantageous, for example, for fire safety areas and escape doors.

The blocking member may be mounted in a linearly displaceable manner within a main body, where the second end portion of the spring member is connected to the blocking member, in order to displace the blocking member from the locking position into the release position and back. Here, a position on the main body is to be understood as a position "within" the main body. Thus, the blocking member may be utilized directly as a stop for the door opener latch, whereby the stop may be withdrawn by linearly displacing the blocking member (for example, a cuboid body) and thus allowing an unimpeded pivot of the door opener latch. The at least one linearly displaceable blocking member allows a very simple and compact design.

The blocking member may be a latch lever hingedly mounted to the main body, which forms, in the locking position, a stop for the door opener latch in the closed position. Then the latch lever may be locked directly by means of the plunger, the spring member, and the actuator, or indirectly, for example, by means of a locking member. The pivotable latch lever utilizes the conventional design of a door opener operated with solenoids, which is also compact and reliably locks the door opener latch in such a way that it is largely protected against manipulation.

The door opener may comprise a locking member, which is mounted in the main body to be pivotable from an interlocking position to a release position and has the shape of a locking bolt, wherein the locking bolt shape of the locking member, in the interlocking position, forms a stop for the latch lever in the locking position, which prevents the latch lever from pivoting from the locking position into the release position. The locking bolt may, for example, be reliably operated by means of the actuator plunger, whereby a decoupling by means of the spring member has again proven advantageous. The locking of the latch lever by means of the locking member may lead to tension due to the positive and frictional lock with the locking bolt shape, when forces are acting upon the door opener latch and the latch lever. Here, the actuator does not have to counteract these forces. Rather, a brief reduction of the external forces allows the spring member, acting as a store of energy, to displace the locking member, which is relieved from any forces at that time.

The latch lever may be spring biased by means of a spring that pivots the latch lever from the release position into the locking position. Alternatively or additionally, the locking member may similarly be spring biased by means of a spring that pivots the locking member from the release position into the interlocking position. Thus, a locking state may be forced as the initial position, that is, a permanent default state (permanently closed state, or, in case of reverse-acting springs, a permanently open state with the latch lever and/or the locking member in the release position).

The actuator may include a linearly displaceable plunger, which is arranged, for example, for acting upon the blocking member, in order to displace the blocking member from the locking position into the release position when the plunger is moved in the direction of the blocking member. The plunger may be connected to the second end portion of the spring member. The plunger allows realizing a compact and reliable actuation.

In an optional embodiment, the actuator may include a linearly displaceable plunger which is arranged to act upon the locking member, in order to pivot the locking member from the interlocking position into the release position when the plunger is moved in the direction of the locking member, whereby the plunger is connected to the second end portion of the spring member.

The plunger is preferably guided in a rotationally fixed manner. This reduces friction losses and ensures a reliable linear movement into an actuation position and a reset into the initial resting position.

In two end positions, the spring member may not engage with the worm thread and may not be displaced by the worm thread upon further rotation of the thread. This allows the actuator, for example, an electric motor, to rotate freely in the end positions. Thereby, the power consumption and the effort of calibration are reduced. An actuator controller does not need to be tuned to stop in the end positions. It is only necessary to ensure that the actuator is activated long enough such that it safely moves from one end position to the other end position.

The pivot axis of the door opener latch may be oriented in a direction that is rotated by 90° with respect to the direction of extension of the pivot axis of the latch lever and the locking member. This ensures a compact and reliable design.

The door opener may include a door sensor that monitors the presence of the door lock latch. This door sensor may be disposed adjacent to the door opener latch and may cooperate with the lock latch. For this purpose, a button (micro switch) may be provided, for example, that is actuated, for instance, via a pivotable plate or a plunger, upon which the lock latch exerts a force when the lock latch is positioned behind the door opener latch and locked by means of the door opener.

The door sensor may be used to sense the current state to signal a monitoring unit whether the door is closed, that is, whether the lock latch is locked by the door opener latch or not.

The door sensor may further be used to drive the door opener or the actuator, in order to trigger a state change. When an opening signal is sent to the electric motor to open the door, whereby the electric motor is to displace the blocking member from the closed position into the open position, the spring member is biased by the operation of the electric motor. However, the blocking member may remain in the blocking closed position for as long as a force is exerted onto the door opener latch via the door, for example, via the door seals. Then, the user may release the blocking member by briefly pushing or pulling the door, such that the blocking member moves into the open position. If the time period until the automatically controlled return of the electric motor into the closed position is too short, the user may miss the open time period and may need to request the door opener release again. However, when the time period is too long and the door is closed again immediately upon opening, while the door opener is still in the open position, the forces acting upon the door opener latch cannot ensure that the door opener latch actually reaches the locked closed position together with the blocking member.

Here, it is possible to trigger the state change by means of the door sensor, when the door sensor detects, after the transition into the open position, that the lock latch no longer actuates the door sensor and thus that the door has been opened. Thereby the transition into the closed state may happen in a timely fashion sufficiently early, such that the closed state is reached before the door is closed again and the lock latch catches in the door opener latch that is now locked once more. It is thus not required to set the time for the state change. However, the time may be provided in order to set a maximum time after which a state change from the open into the closed state is ensured, even when the door that is temporarily released for opening has not been opened.

BRIEF DESCRIPTION OF THE DRAWINGS

The invention will be explained in more detail below by means of exemplary embodiments together with the accompanying drawings. In these.

DETAILED DESCRIPTION OF THE INVENTION

Figure 1:
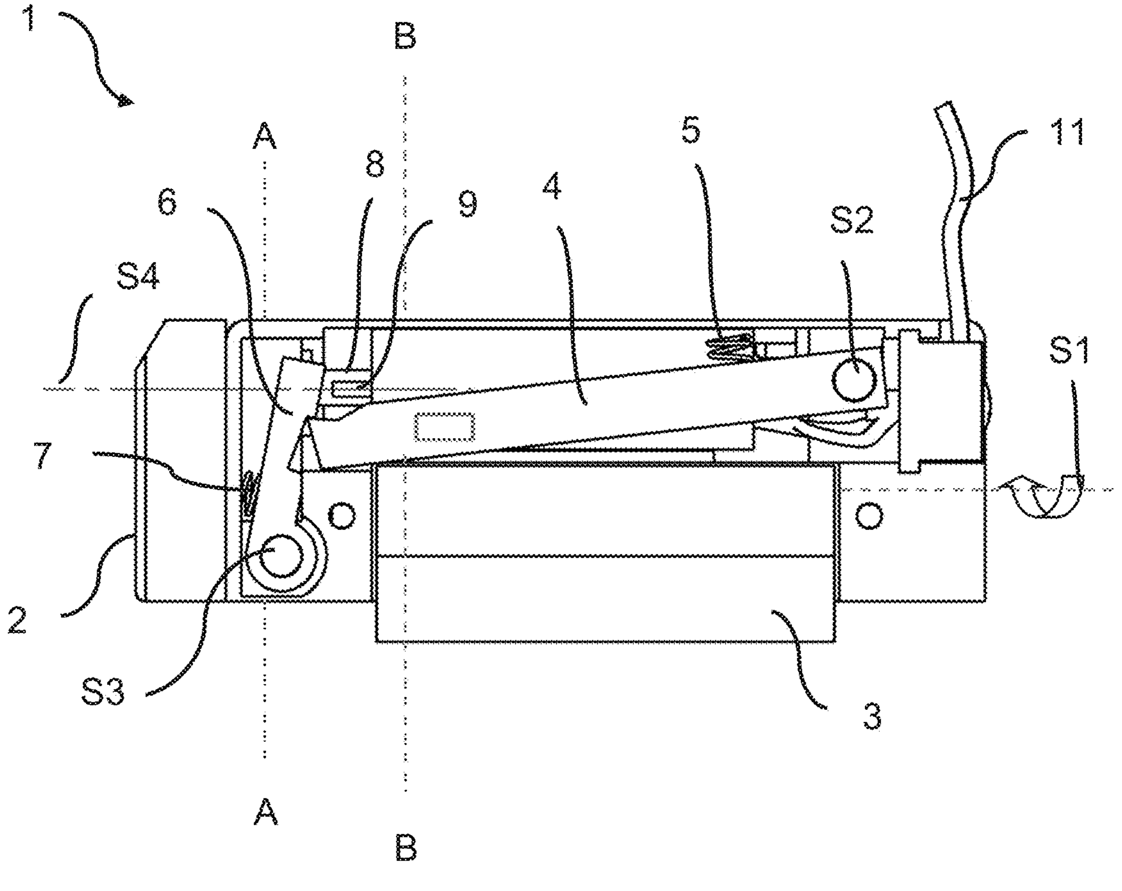
FIG. 1 illustrates a top view of a first embodiment of a door opener in a closed position.

FIG. 1 illustrates a top view of a door opener 1 in a first exemplary embodiment. The door opener 1 comprises a main body 2, which, for example, may have a metal housing. A plurality of movably arranged functional elements is installed within this main body 2. A door opener latch 3 (also known as a swing bolt) is pivotally disposed about the pivot axis S1 for locking the door bolt of a door, the pivot axis extending horizontally in the figure.

Furthermore, an unlocking mechanism comprising a latch lever 4 is provided. The latch lever 4 is pivotally hinged about the axis S2 within the main body 2. In the illustrated closed position of the door opener latch 3, the latch lever 4 forms a stop for the door opener latch 3 and causes the door opener latch 3 to pivot from the closed position into the open position.

It is thus apparent that there is a positive lock between the latch lever 4 pivoted into the illustrated locking position and the door opener latch 3 in the closed position.

It can be seen that the latch lever 4 is spring biased by means of a first biasing spring member 5, which brings the latch lever 4 in the illustrated locking position when the latch lever 4 is able to move freely.

The unlocking mechanism is further provided with a locking member 6 pivotally hinged to the main body 2. Said member is positioned at the main body 2 to be pivotable about the pivot axis S3, in order to move from the illustrated interlocking position into a release position to the left against the force of a second biasing spring member 7.

It can be seen that a plunger 8 acts upon and may be in contact with an actuation surface of the locking member 6. In the illustration of FIG. 1, the plunger 8 is linearly displaceable in the horizontal direction from left to right and back.

The plunger 8 may be rotationally fixed, so as to not rotate when moving linearly. However, this is merely optional. For this purpose, the plunger 8 may, for example, have a groove 9, which a fixing pin engages with, in order to prevent, by forming a positive lock, a rotation of the plunger 8 about the axis in its direction of extension, that is, about the axis S4 indicated by a dashed line, when the plunger 8 is displaced in the linear direction.

It is apparent that the locking member 6 has the shape of a locking bolt, for example as a dent-like recess formed by protruding stop faces or the like, for instance, in order to form a stop for the latch lever 4 in the interlocking position. Thus, the locking member 6 extends, for example, over the free end of the latch lever 4 with its locking bolt shape in order to thereby form a positive lock with the latch lever 4 and hold it in the locking position. Therefore, pivoting the latch lever 4 is prevented in the interlocking position of the locking member 6.

The latch lever 4 and the locking member 6 are spring biased by the first biasing spring member 5 and the second biasing spring member 7, which move the latch lever 4 into the locking position and the locking member 6 into the interlocking position. In this manner, a permanent position, for example, in the permanently closed operation (locking position of the blocking member) is set, where the door opener 1 automatically secures the door opener latch 3 in the closed position with the plunger 8 retracted and thus securely closes the door. This permanently closed operation and conversely, with the inverse arrangement of the springs, a permanently open operation (release position of the blocking member), can be ensured to improve reliability, if a retracted position of the plunger 8 is ensured even in the case of an actuator failure. An imminent failure may, for example, be detected by means of an emergency energy store, such as a capacitor, or by monitoring the available residual battery power.

The plunger 8 is linearly displaced by means of an actuator, not shown, for example, in the form of an electric motor, which may be driven via an electric line 11 and a control unit, which is not shown. However, it is also contemplated that a battery is housed within the main body 2 or on the main body 2, for example, in a battery compartment, with additional control electronics, if necessary.

The control electronics may be integrated with a battery-powered control unit (e.g. a reader) located adjacent to a door, said control unit comprising one or more of a keypad for entering pin codes, a radio unit for scanning a transponder or a smartphone (for example via RFID, NFC, Bluetooth, ZigBee, WiFi etc.), and a biometric input unit (e.g. iris or fingerprint). The battery of the control unit may be used for supplying the actuator of the door opener. A state signal (door open in case of absence of the lock latch in the door opener latch or door closed in case of presence of the lock latch locked by the door opener latch) detected by means of a door sensor of the door opener may be transmitted to the control unit and from there to a central station (event signal). From the central station or from another release point via the central station or directly via the control unit, an open signal may be transmitted to the door opener for activating the actuator and displacing the blocking member into the open position (opening signal).

Figure 2:
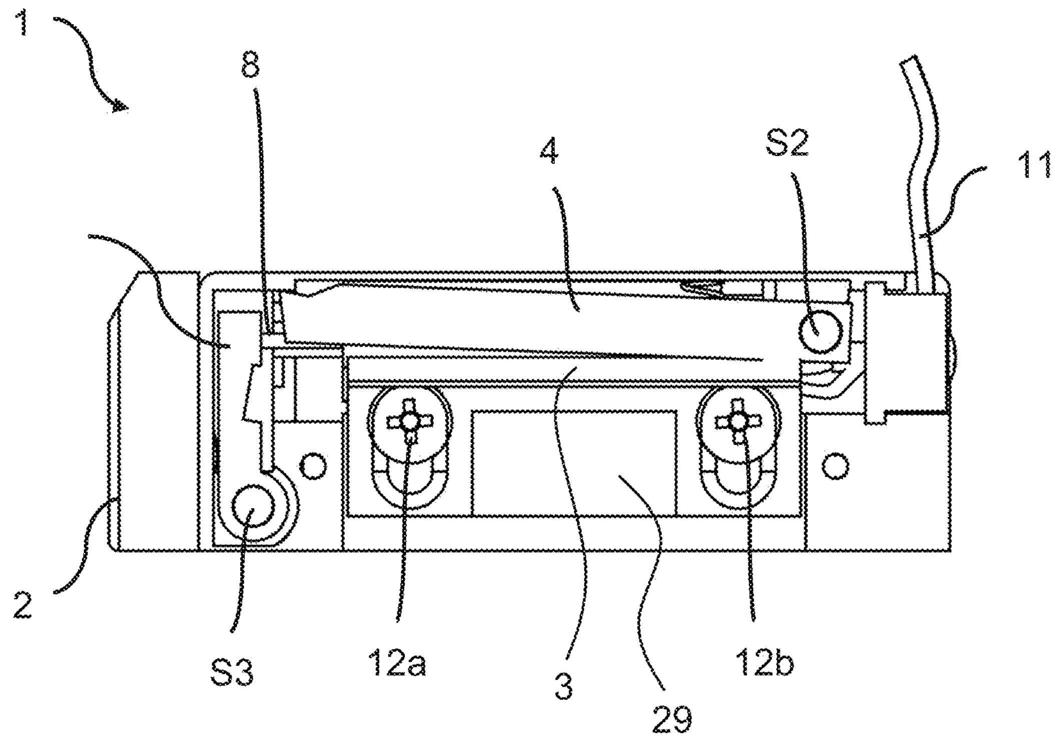
FIG. 2 illustrates the door opener of FIG. 1 in an open position.

FIG. 2 illustrates the door opener 1 of FIG. 1, here with the door opener latch 3 pivoted into the open position. It can be seen that the door opener latch 3 may be arranged on the main body 2 by means of adjusting screws 12*a*, 12*b*, such that the contact pressure of a door in the closed position onto the door opener latch can be adjusted when there is a positive lock of the door opener latch with the door bolt.

It can be seen that the latch lever 4, in the illustrated open position, is now pivoted away from the door opener latch 3 into the release position. In doing so, the latch lever 4 is pivoted about the pivot axis S2 against the spring force of the first biasing spring member 5 in a clockwise direction. This is possible, because the locking member 6 is now pivoted about its pivot axis S3 away from the latch lever 4 in a counterclockwise direction, that is, against the pivot direction of the latch lever 4. This pivoting motion of the locking member 6 from the interlocking position into the release position is caused by the plunger 8, which the actuator has displaced linearly towards the locking member 6.

The linear motion of the plunger 8 thereby unlocks the locking member 6 and unlocks the door opener 1, such that a door coupled with the door opener 1 may be opened.

A door sensor 29 monitoring the presence of the door lock latch behind the door opener latch 3 in the locked position is disposed adjacent to the door opener latch 3. Here, the sensor may be an interior push-button (not shown) (e.g., a micro switch) positioned behind the illustrated plate or a plunger. If the door lock latch rests on the plate or the plunger, it will be displaced by the force applied thereon and will actuate the push-button behind it. The push-button and the cooperating plate or plunger may be brought into the initial position by means of a spring, which position is reached in the absence of the door lock latch. The door sensor 29 may be used to signal the closed or open state of the door according to the presence of the door lock latch. It may also be used to cause the door opener 1 to switch from the open position into the closed position, once the absence of the door lock latch has been detected after an opening operation.

Figure 3:
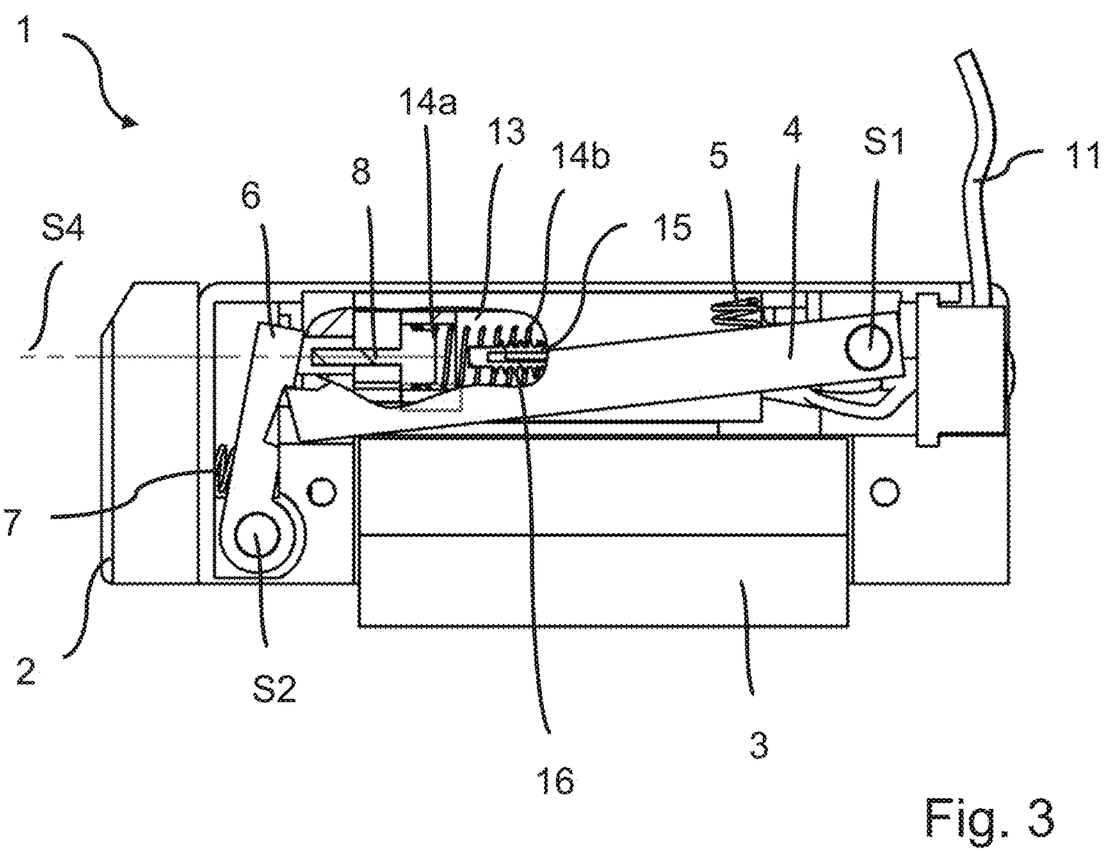
FIG. 3 illustrates a partial sectional view of the door opener of FIG. 3 showing the spring member with plunger.

FIG. 3 shows a partial section of the door opener 1 of FIG. 1 in the closed position of the door opener latch 3. It can be seen that the plunger 8 is coupled with an actuator spring member 13. For this purpose, the second end portion 14*a* of the actuator spring member 13 is fixedly connected to the plunger 8. For example, the actuator spring member 13 may be wound with its second end portion 14*a* coils about the outer periphery of the plunger 8 to form a frictional and positive lock with the plunger 8. The first end portion 14*b* of the actuator spring member 13 engages with the worm thread 15, which is disposed on the drive shaft 16 of an actuator that is not shown. The worm thread 15 is disposed to be rotatable about an axis S4.

In the illustrated interlocking position of the locking member 6, the first end portion 14*b* is displaced away from the locking member 6 towards the actuator (to the right in FIG. 3). This is achieved by guiding spring coils of the first end portion 14*b* of the actuator spring member 13 on the worm thread and thus linearly displacing them into the direction of extension of the axis S4.

Figure 4:
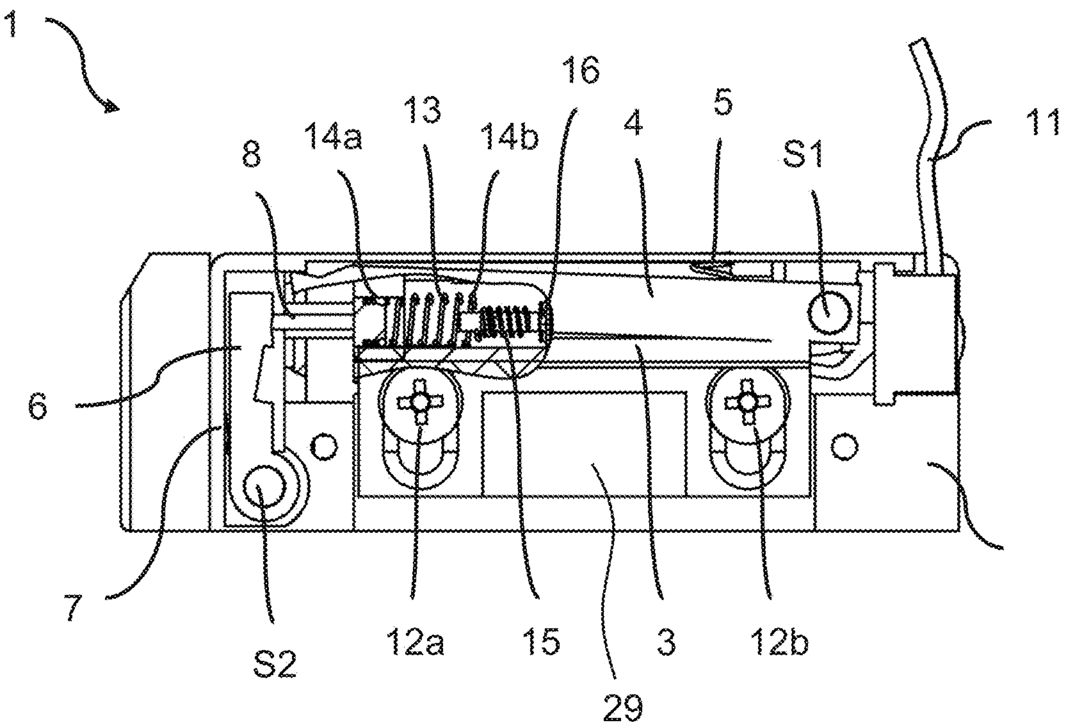
FIG. 4 illustrates a partial sectional view of the door opener of FIG. 2 showing the spring member with plunger.

FIG. 4 shows a partial sectional view of the door opener 1, now in the open position of the door opener latch 3 of FIG. 2. It can be seen that the first end portion of the actuator spring member 13 is displaced horizontally to the left on the worm thread 15. Thereby, the opposing second end portion 14*a* of the actuator spring member 13 is also linearly displaced together with the connected plunger 8 towards the locking member 6. The spring force of the actuator spring member 13 pivots the locking member about its pivot axis S2 against the force of the second biasing member 7 from its interlocking position of FIG. 3 into the release position shown here. This releases the positive lock with the latch lever 4, such that the force acting onto the door opener latch 3 pivots the latch lever 4 away from the door opener latch 3 upwards against the spring force of the first biasing spring member 5.

Figure 5:
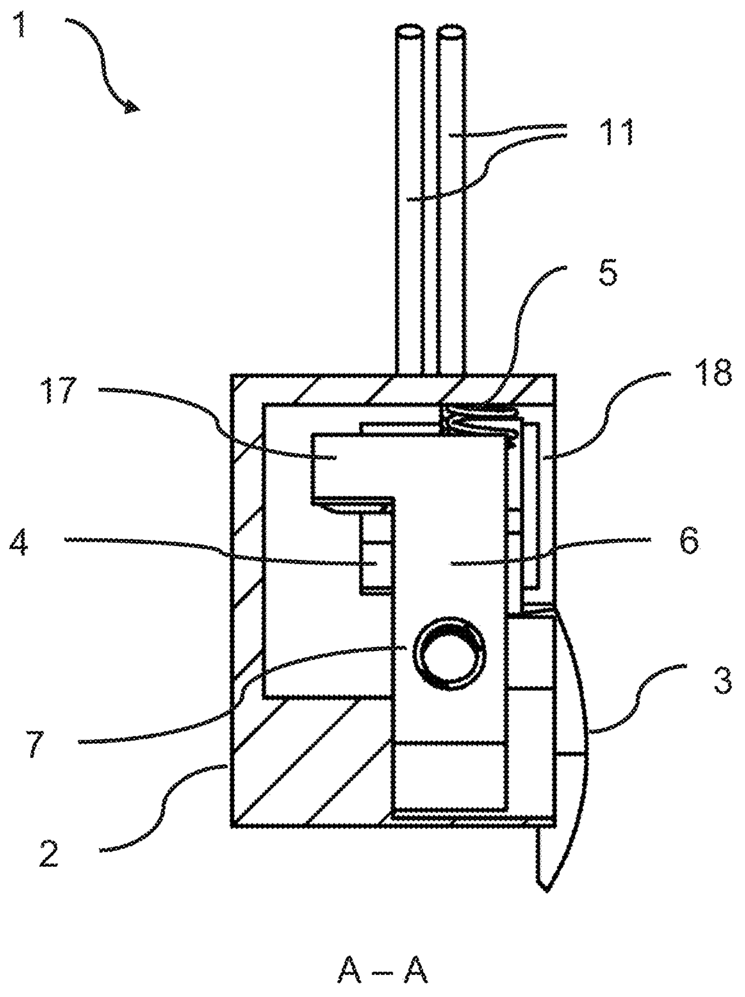
FIG. 5 illustrates a sectional side view of the door opener of FIG. 1 in the closed position along section A-A.

FIG. 5 depicts a sectional side view of the door opener 1 of FIG. 1 along section A-A marked therein. It is apparent that the door opener latch 3, in the illustrated closed position, is oriented approximately parallel to the side wall, where the door opener latch 3 is pivotally arranged and protrudes from.

It is further apparent that the second biasing spring member 7 biases the locking member 6 in the direction of view, the member engaging with the latch lever 4. The locking member 6 thus extends over the latch lever 4.

In the illustrated example embodiment, the locking member 6 is embodied in the shape of an L and includes an actuation portion 17 pointing away from the door opener latch 3. Thus the plunger 8 may act upon the locking member 6 in a region adjacent to the latch lever 4.

It will also be apparent that the main body 2 may be closed with a cover member 18 that may be mounted above the pivotally arranged door opener latch 3 on the side of the door opener latch 3. This cover member 18 is not present in the partially open representations of FIGS. 1 to 4, that is, it has been removed in these illustrations.

Figure 6:
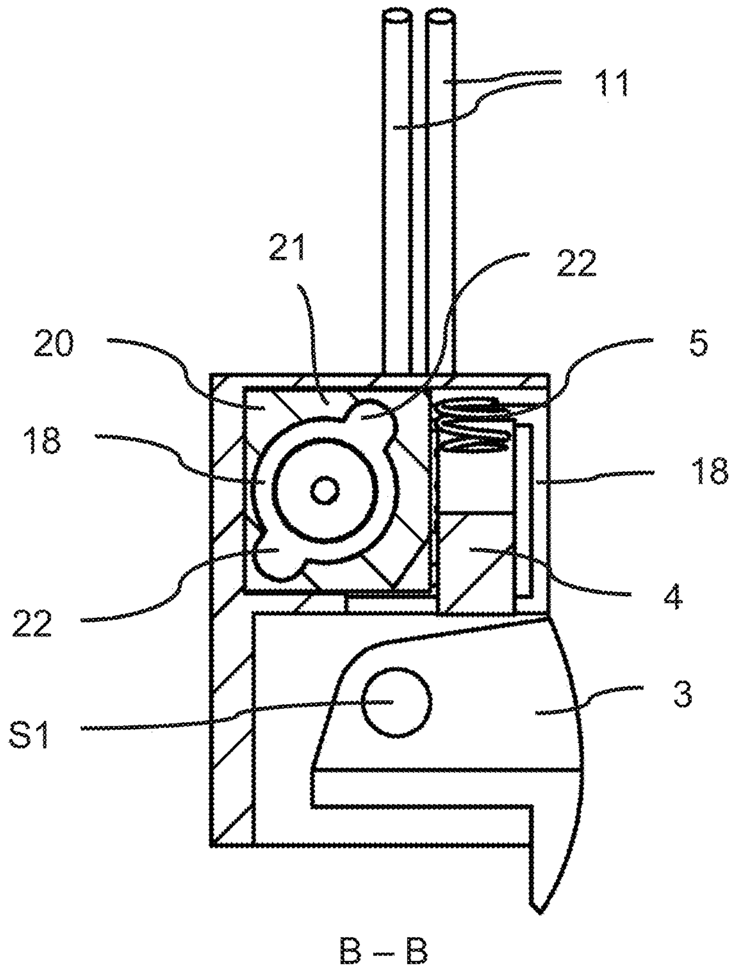
FIG. 6 illustrates a partial sectional view of the door opener of FIG. 1 along section B-B.

FIG. 6 depicts a sectional side view of the door opener 1 of FIG. 1 in the closed position along section B-B. It will be apparent that the latch lever 4 forms a stop for the door opener latch 3 mounted to be pivotable about the pivot axis S1, where the latch lever 4 is pivoted towards the door opener latch 3.

The actuator 20 is disposed next to the latch lever 4 with an actuator housing 21, which accommodates the actuator spring member 13, the plunger 8, and the worm thread 15 with the electric motor. It will be apparent that the actuator housing 21 has an opening with groves 22 in which to guide the plunger 8 in a rotationally fixed manner. For this purpose, the plunger 8 may be provided with protrusions with which to engage these grooves 22. However, the inverse solution is also contemplated, where the plunger 8 is provided with at least one groove, with which a protrusion for rotationally fixed guidance engages.

Figure 7:
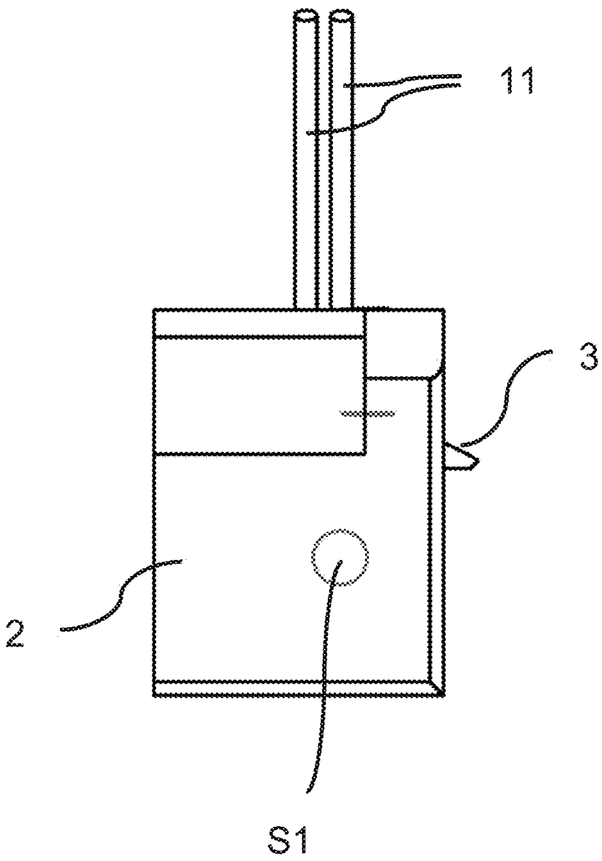
FIG. 7 illustrates a side view of the opened door opener of FIG. 2.

FIG. 7 illustrates a side view of the door opener 1 in the open position of FIG. 2. It is apparent that the door opener latch 3 is pivoted by 90° about the axis S1, in the direction of view of FIG. 7 counterclockwise. The door opener latch 3 is therefore in the open position and releases a previous stop for the door bolt of a door lock. Then the door may be opened by pivoting.

Figure 8:
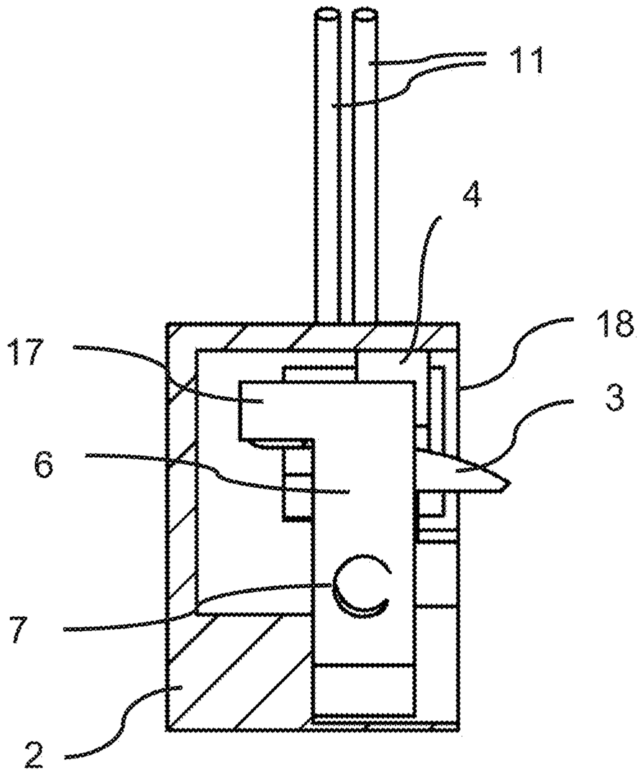
FIG. 8 illustrates a side view of the door opener of FIG. 2 along section A-A.

FIG. 8 shows a section of the door opener 1 of FIG. 7 in the open position along section A-A. It will be apparent that the latch lever 4 has been pivoted upwards away from the door opener latch 3. This becomes possible, because the locking member 6 has been pivoted towards the viewer in the viewing direction of FIG. 8 and has released the stop for the latch lever 4. This is caused by linearly displacing the plunger 8, which acts upon the actuation surface 17 of the locking member 6.

Figure 9:
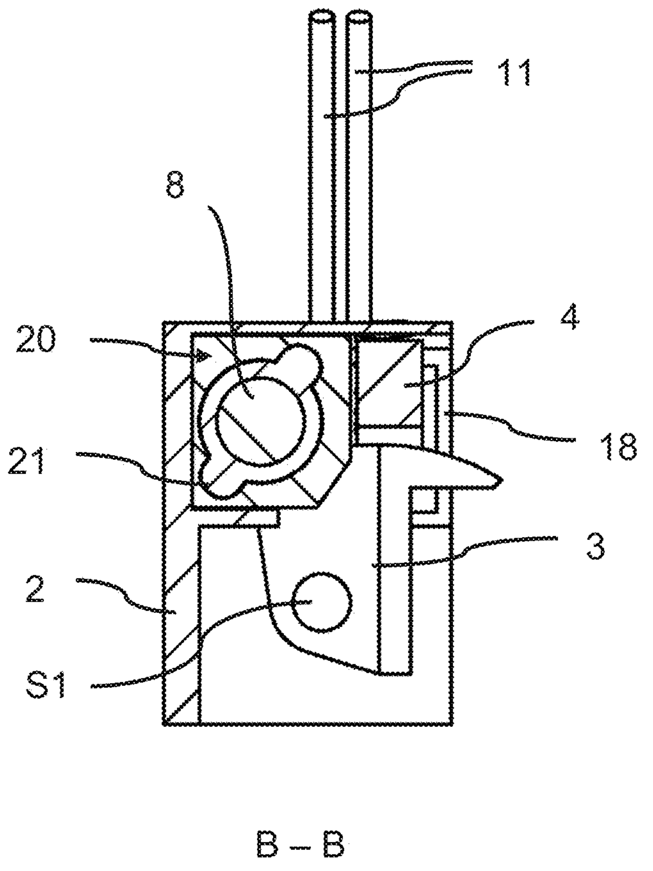
FIG. 9 illustrates a side view of the door opener of FIG. 2 along section B-B.

FIG. 9 shows a section of the door opener 1 of FIG. 2 in the open position along section B-B. Here, it becomes even more apparent that the door opener latch 3 has been pivoted by 90° about its pivot axis. For this purpose, the latch lever 4 is pivoted upwards and away from the door opener latch 3, such that the door opener latch 3 may be pivoted from the closed position into the open position and back without any restriction of movement by the latch lever 4.

The actuator 20 is accommodated in the remaining space within the main body 2, such that the actuator housing 21 does not impede the movement of the door opener latch 3.

Figure 10:
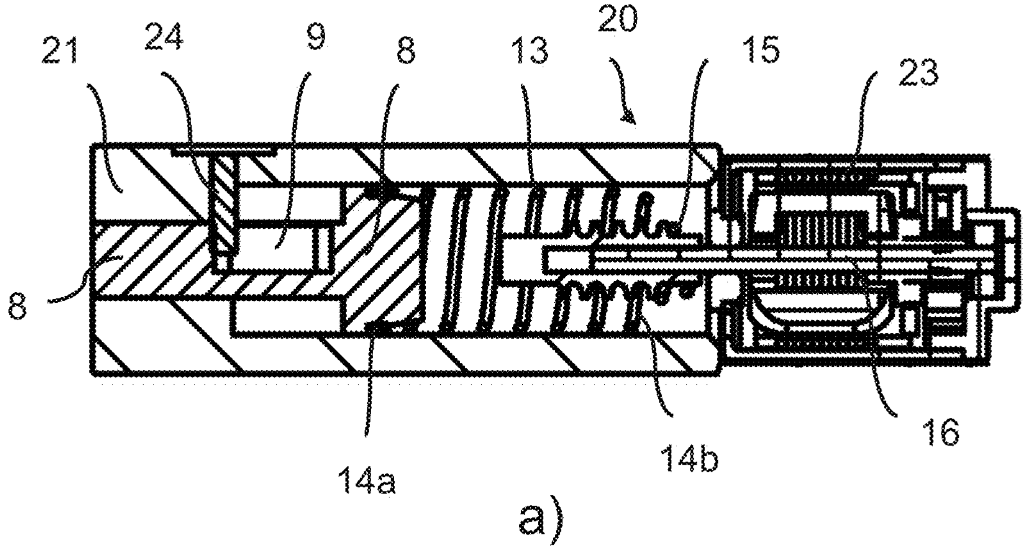
FIG. 10*a*) illustrates a sectional view of the electric motor with worm thread, spring member, and plunger in the resting position.
FIG. 10*b*) illustrates a sectional view of FIG. 10*a*) with the plunger in the unlocked position.
Figure 10:
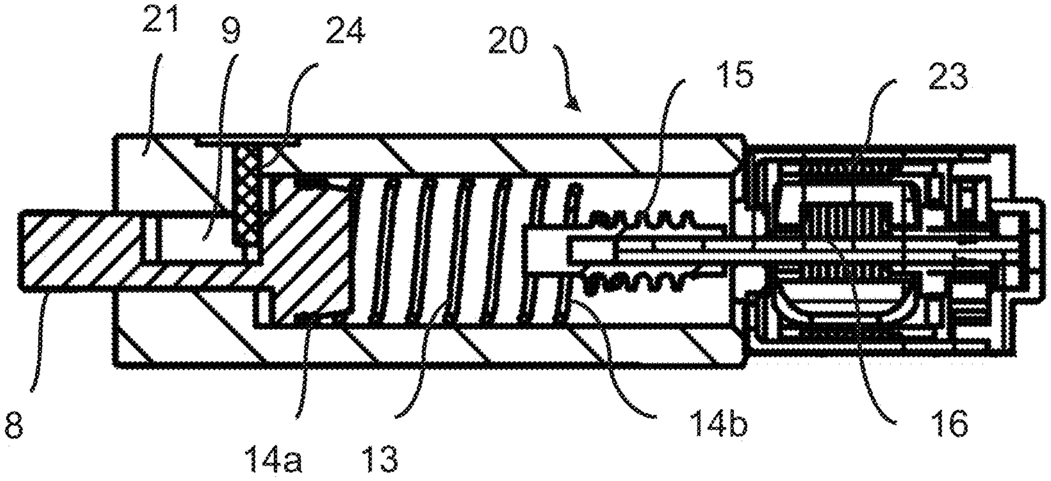

The basic design of the actuator 20 is exemplified in FIGS. 10*a*) and 10*b*). Here, FIG. 10*a*) depicts the actuator 20 in the resting position, where the plunger 8 is completely or largely retracted into the actuator housing 21. This is achieved by displacing the first end portion 14*b* of the actuator spring member 13 linearly towards the electric motor 23, in the viewing direction to the right. This is done by rotating the worm thread 15 by means of the drive shaft 16 of the electric motor 23 upon activating the electric motor 23. This linearly displaces the spring coils in the first end portion 14*b* engaged with the worm thread 15 towards the electric motor 23, and the actuator spring member 13 is released towards the second end portion 14*a* with the plunger 8. This causes a linear displacement of the plunger 8 into its resting position towards the electric motor 23.

In the illustrated example embodiment, it is apparent that the plunger 8 has a groove 9 with which a guide pin 24 engages. Therewith, the plunger 8 is mounted to the actuator housing 21 in a rotationally fixed manner, but such that it may be displaced from left to right in the direction of view.

FIG. 10*b*) illustrates the actuator 20 in the unlocked position. Here, the plunger 8 is linearly pushed out of the actuator housing 21. Die resting end position and the unlocked end position may be preset by the length of the groove 9 and the guide pin 24.

It is apparent that the first end portion 14*b* of the actuator spring member 13 does not engage with the worm gear 15 in the illustrated end positions, such that the worm thread 15 may rotate freely when the electric motor 23 rotates. Therefore, the electric motor 23 only has to be activated sufficiently long to reach at least the end position. Thereafter, the electric motor 23 may further freewheel without requiring much power or force. In this way, extensive calibration for the activation phase of the electric motor 23 is not required.

In the illustrated unlocking position, the first end portion 14*b* is linearly displaced to the left on the worm thread 15, where the spring coils engaging with the worm thread 15 by means of a positive lock with the worm thread 15 are linearly displaced on the thread turns.

Figure 11:
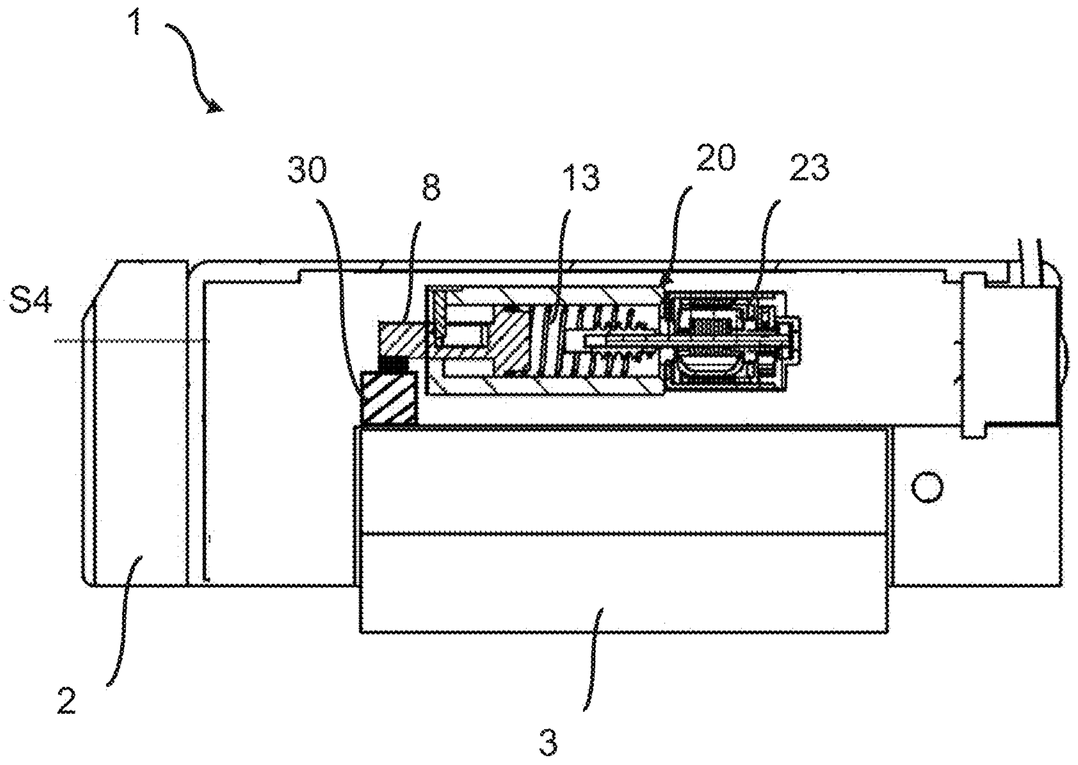
FIG. 11 illustrates a second embodiment of the door opener with a linearly displaceable blocking member in the closed position.

FIG. 11 shows a partial sectional view of a second embodiment of a door opener 1. Again, the door opener latch 3 is pivotally mounted to a main body 2. In this embodiment, a blocking member 30 is disposed on the main body 2 such that it can be linearly displaced along the axis S4, that is, in the viewing direction of FIG. 11 horizontally from left to right.

In the illustrated closed position, the blocking member 30 forms a stop for the closed door opener latch 3. The blocking member 30 may be connected with the plunger 8 of the actuator 20 in a direct manner, as illustrated, or indirectly (not shown). The plunger 8 is in the resting position and is again indirectly coupled to the electric motor 23 via the actuator spring member 13. In this regard, reference is made to the illustrations of FIGS. 10*a*) and 10*b*).

Figure 12:
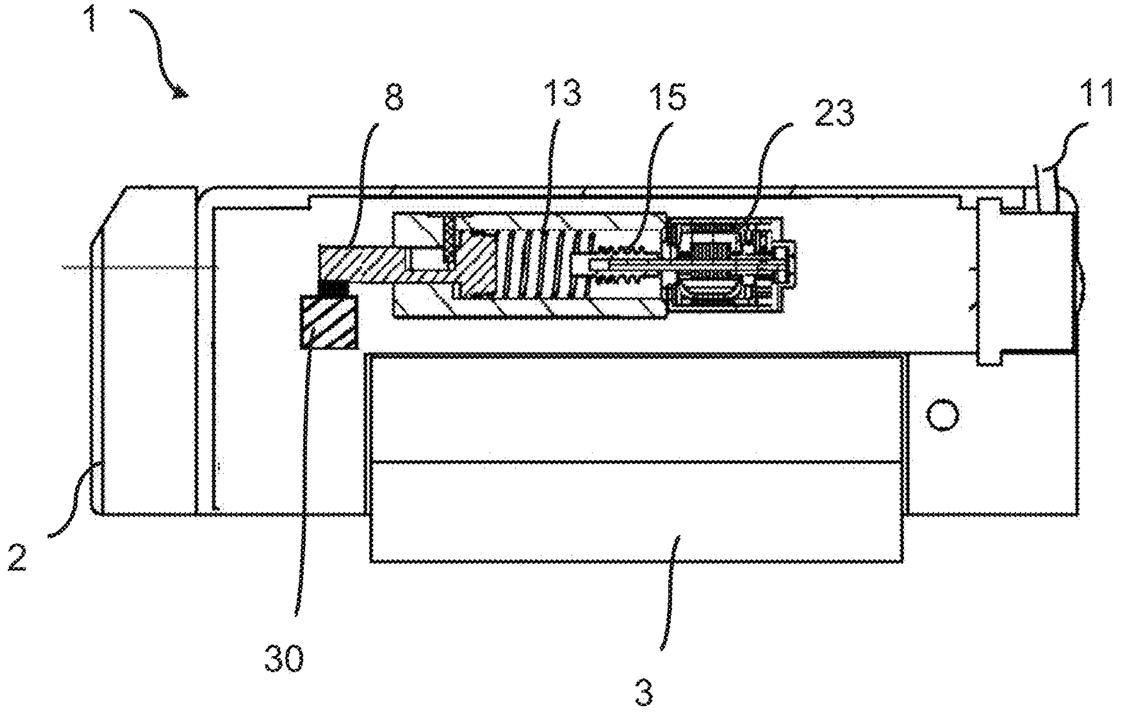
FIG. 12 illustrates a top view of the door opener of FIG. 11 in an unlocked open position.

FIG. 12 depicts a partial sectional view of the door opener 1 of FIG. 1, now in the unlocked position of the blocking member 30. Here, the blocking member 30 is displaced away from the stop position in positive lock with the door opener latch 3 by linearly displacing the plunger 8. This is achieved by rotating the worm thread 15, which linearly displaces the driving spring member 13 and thus the plunger 8.

In the case, where the actuator spring member 13 has been brought into the illustrated unlocked position, but the door opener latch 3 still exerts a force onto the blocking member 30 via the positive lock, the blocking member 30 may still be in the locking position of FIG. 11. However, when the contact pressure onto the blocking member 30 is temporarily relieved for a short period of time, the force of the actuator spring member 13 may bring the blocking member 30, which is mounted linearly displaceable within the main body 2, into the unlocking position. Therefore, the actuator spring member 13 serves as a store of energy.

Figure 13:
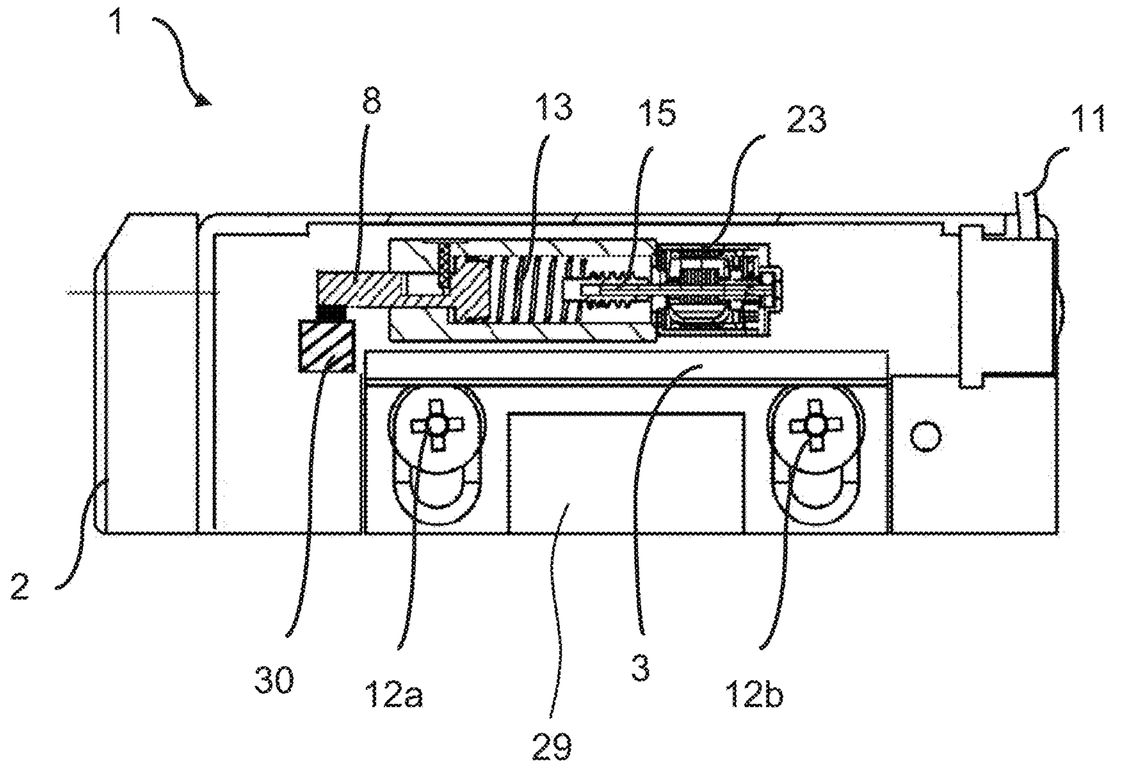
FIG. 13 illustrates a top view of the door opener of FIG. 12 in the open position with the door opener latch in the pivoted position.

FIG. 13 illustrates the door opener 1 of FIG. 12 in the open position of the door opener latch 3, which has been pivoted by 90° from the closed position of FIGS. 11 and 12 into its open position. This is possible, because the blocking member 30 has been guided outside of the range of motion of the door opener latch 3.

A door sensor 29 may be present in this embodiment as well. In this regard, reference is made to the description of FIG. 2.

Figure 14:
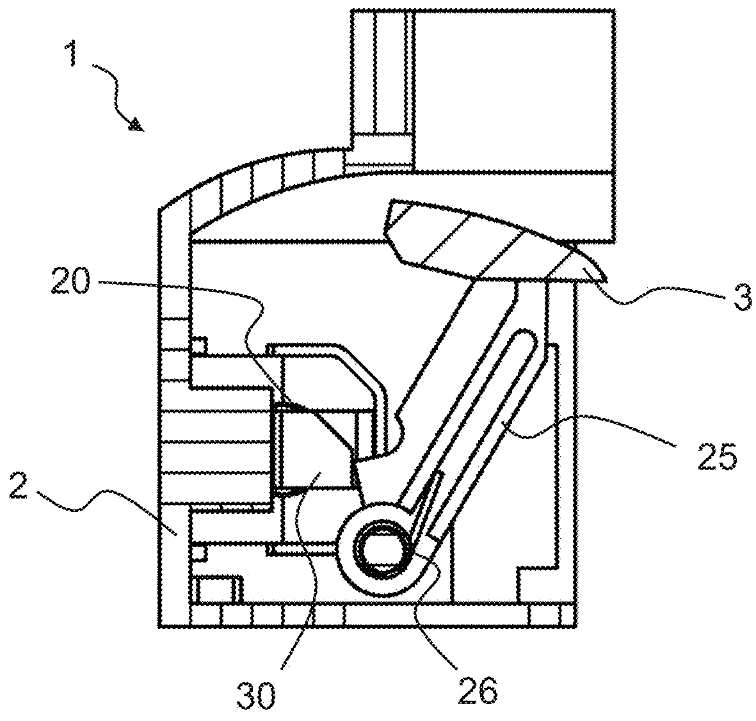
FIG. 14 illustrates a sectional side view of another embodiment of a door opener in a closed position.

FIG. 14 illustrates a sectional side view of another embodiment of a door opener 1 in the closed position. It is apparent that the door opener latch 3 protrudes to the right into the lock latch (not shown) accommodating space, which is open towards the front, the door opener latch forming a stop for the lock latch. The door opener latch 3 is disposed at one end of a latch pivot arm 25, to form an integral metal part, for example. The latch pivot arm 25 is mounted to a pivot axis S5 in such a way that it may be pivoted about this pivot axis S5. Preferably, two latch pivot arms 25 are provided adjacent to each other in the viewing direction and mounted together onto the pivot axis S5.

A latch return spring 26 is connected to the latch pivot arm 25 and formed such that the spring force pivots the door opener latch 3 into the illustrated closed position.

A blocking member 30 is disposed linearly displaceably by means of an actuator 20 in the main body 2, such that the blocking member 30, in the closed position, forms a stop for the latch pivot arm 25. It will be apparent that the blocking member 30 is positioned to the left behind the latch pivot arm 25, in order to prevent pivoting the latch pivot arm 25 (in the figure in the counterclockwise direction) in the direction of the back wall of the main body 2 opposite the open accommodating space. Thus, the door opener latch 3 cannot be displaced into the open position.

Figure 15:
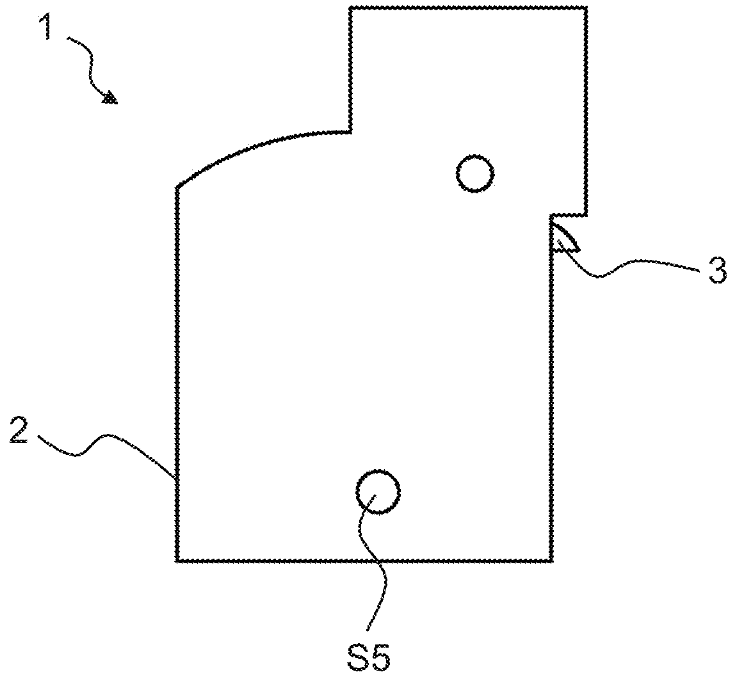
FIG. 15 illustrates a side view of the door opener of FIG. 14 in the closed position.

FIG. 15 illustrates a side view of the door opener 1 of FIG. 14 in the closed position. It can be seen that the door opener latch 3 protrudes slightly from the face of the open accommodating space. However, this is optional and not mandatory. The pivot axis S5 for the latch pivot arm 25 is also illustrated.

Figure 16:
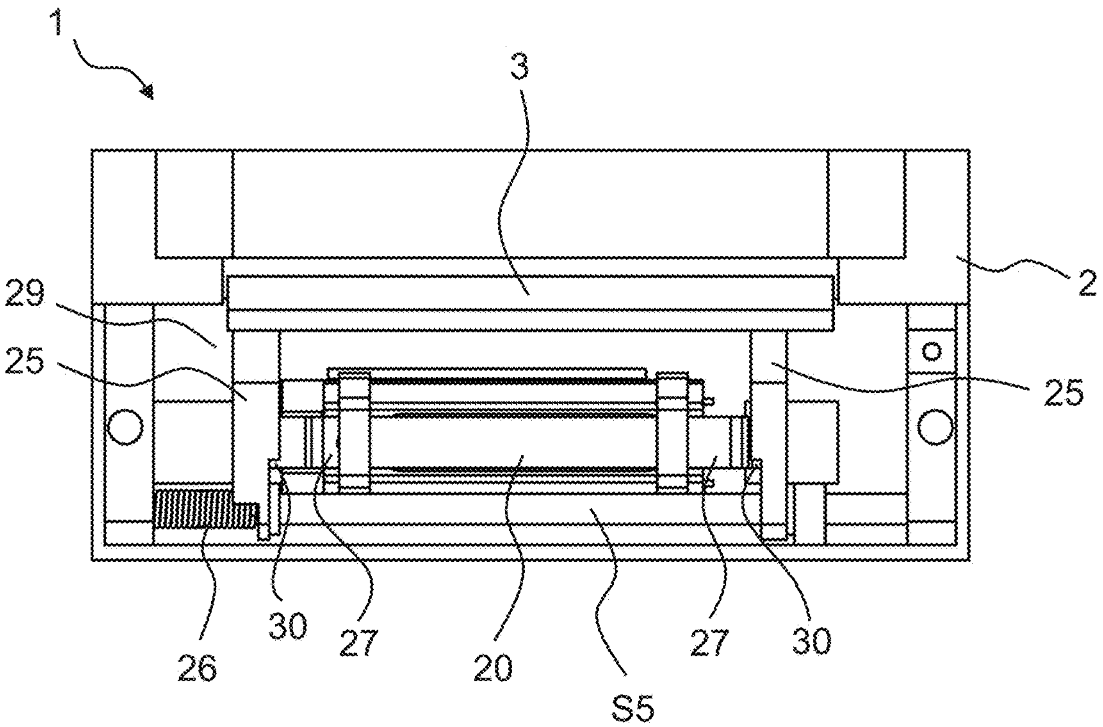
FIG. 16 illustrates a front view of the door opener of FIG. 14 in the closed position with blocked door opener latch.

FIG. 16 illustrates a front view of the door opener 1 of FIG. 14 in the closed position with blocked door opener latch 3. Here it is apparent that there are two latch pivot arms 25 spaced apart from each other that are each integrally connected to the door opener latch 3 at their respective ends. The door opener latch 3 extends at a distance to the pivot axis S5, to which the latch pivot arms 25 are pivotally mounted, between the two latch pivot arms 25. Thereby, a lock bolt may reach under the door opener latch 3, such that the door opener latch 3 forms a stop for the lock bolt.

In the illustrated example embodiment, a torsion spring (also known as torsional spring) is disposed on the pivot axis S5 to form the latch return spring 26. One spring arm of the latch return spring 26 is in positive lock with an associated latch pivot arm 25, such that the latter is pivoted into the closed position by the spring force. Optionally, a plurality of latch return springs 26 may be provided, for example, another torsion spring connected to the other latch pivot arm 25.

An actuator 20 is disposed within the main body 2. Here, the technology illustrated in FIG. 10 may be employed, for example. The actuator 20 is connected to a slide 27, which supports the blocking member 30 on at least one side. By linearly moving the slide 27 (in the horizontal direction in the viewing direction of FIG. 16), the blocking member 30 may be positioned behind the associated latch pivot arm 25 to form a stop preventing a pivot into the open position, or may be moved outside of the range of motion of the associated latch pivot arm 25.

Figure 17:
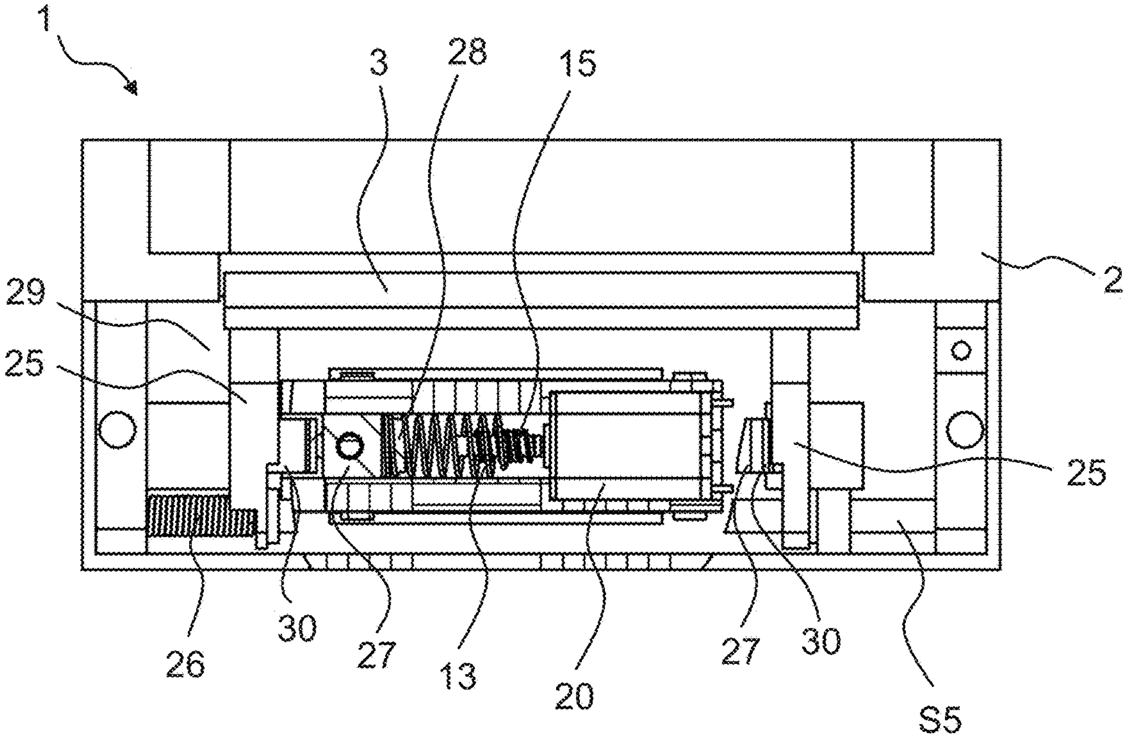
FIG. 17 illustrates a partial sectional front view of the door opener of FIG. 16 in the closed position with blocked door opener latch.

FIG. 17 illustrates a partial sectional front view of the door opener 1 of FIG. 16 in the closed position with blocked door opener latch 3. This shows the example design of the actuator 20 in more detail. The actuator 20 comprises an electric motor which drives a drive shaft having a worm thread 15. A first end portion 14*b* of an actuator spring member 13 is in positive lock with the worm thread 15, such that the end portion 14*b* is horizontally displaced upon rotation of the worm thread 15. With the movement (in the illustrated viewing direction to the left), the actuator spring member 13 is tensioned and exerts a force onto the slide head portion 28 of the slide 27 that is coupled with the second end portion 14*a* of the actuator spring member 13. The slide head portion 28 may, for example, protrude into the interior space of the actuator spring member 13, which thereby encloses the slide head portion 28 in its front portion. The actuator spring member 13 tensioned by the spring force now exerts a force onto the slide 17 through the slide head portion 28, which linearly displaces the slide 27 with its at least one blocking member 30, once the force exerted by a lock bolt via the door opener latch 3 onto the latch pivot arms 25 and the blocking members 30 abutting thereto becomes smaller than the spring force of the actuator spring member 13. The biasing of the actuator spring member 13 for opening the door opener latch 3 prepares the linear movement of the blocking members 30, in order to enable the door opener latch 3 to be pivoted into the open position. The linear motion requires an instance, where force is no longer applied onto the door opener latch 3, that is, where the door locked with the lock bolt is not being pushed or pulled.

Once the stop is released by moving the blocking members 30 out of the range of motion of the latch pivot axes 25, the door opener latch 3 may be pivoted into the open position against the spring force of the latch return spring 26. This may be achieved by pivoting a door to open it, the door being in the locked state with a protruding lock bolt. In doing so, the lock bolt exerts a force onto the now freely movable door opener latch 3, which moves the door opener latch 3 into the open position. After opening the door, the door opener latch 3 pivots back into the closed position under the force of the latch return spring 26. The lock bolt may be pushed back by an inclined face facing the door opener 1 in the usual manner when closing the door when said face hits the door opener latch 3 in the closed position, such that the bolt is guided past the door opener latch 3. After overcoming the door opener latch 3, the lock bolt snaps out again in order to engage under the door opener latch 3.

Figure 18:
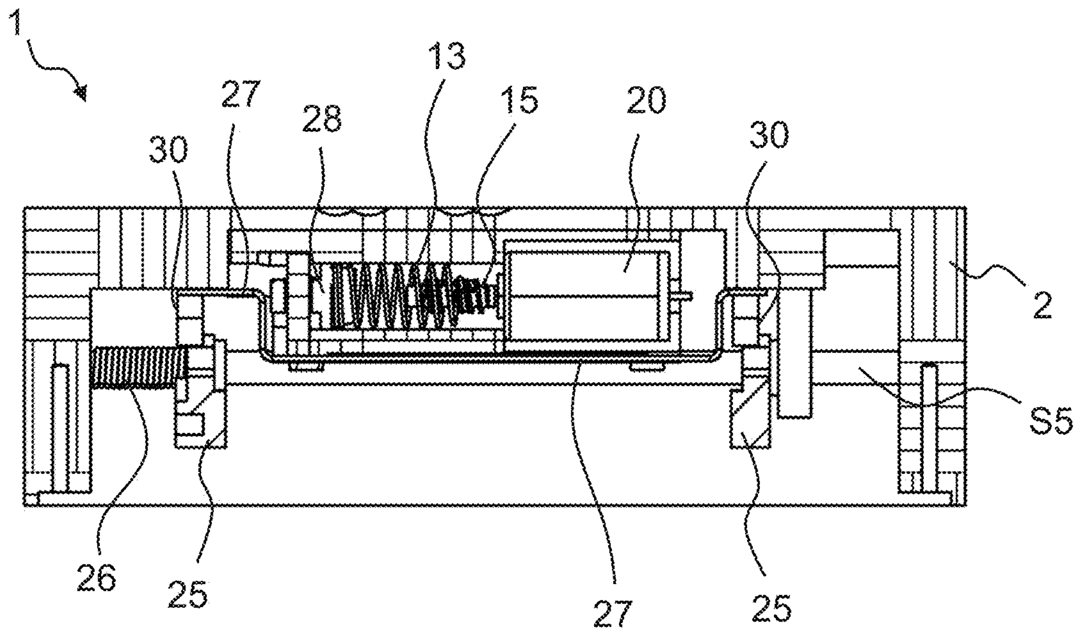
FIG. 18 illustrates a partial sectional top view of the door opener of FIG. 16 in the closed position with blocked door opener latch.

FIG. 18 illustrates a partial sectional top view of the door opener of FIG. 16 in the closed position with blocked door opener latch 3. It will now be apparent that the blocking members 30 are positioned in the pivot space of the associated latch pivot arms 25 to form a stop for the latch pivot arms 25. This prevents that the latch pivot arms 25 pivot into the open position together with the door opener latch 3.

Figure 19:
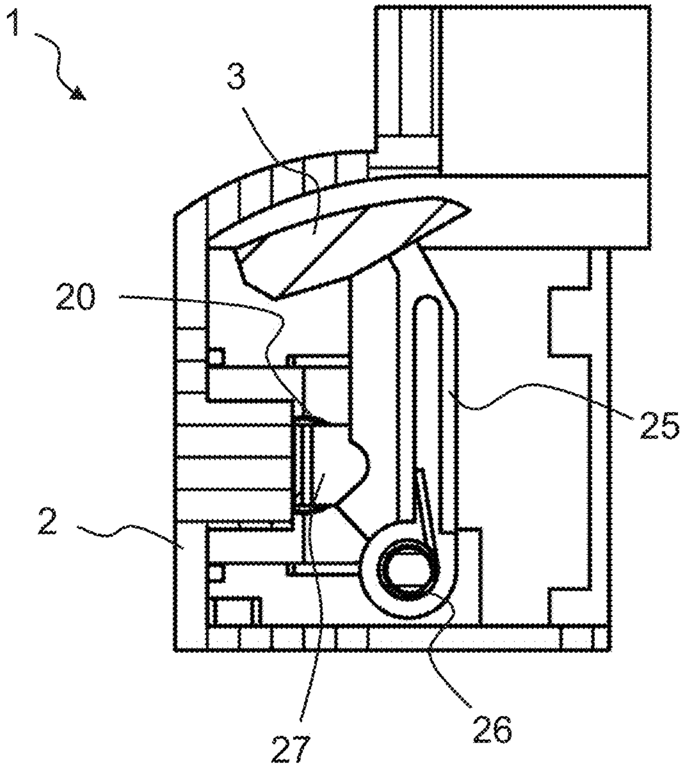
FIG. 19 illustrates a sectional side view of the door opener of FIG. 14 in an open position.

FIG. 19 depicts a sectional side view of the door opener 1 of FIG. 14 in the open position. It will be apparent that the latch pivot arms 25 are now pivoted towards the back of the main body 2 (in the Figure in the counterclockwise direction). Thereby the door opener latch 3 is displaced away from the open accommodating space at the front of the main body 2, in order to clear an upwards path for a lock bolt. In the sectional view, the blocking member 30 is disposed in the cutout area at the front in the direction of view for the visible latch pivot arm 25, such that the blocking member is not shown. However, it will be apparent that the slide 27, at the end of which the blocking member 30 is disposed, passes between the backside of the main body 2 and the latch pivot arm 25. The slide 25 is displaced linearly—in the view of FIG. 19 in the direction of view—by means of the actuator 20.

The latch return spring 26 is also visible, which is disposed on the latch pivot axis S5 with one spring arm engaging with a lateral groove of the associated latch pivot arm 25. This realizes a positive lock between the latch pivot arm 25 and the latch return spring 26.

Figure 20:
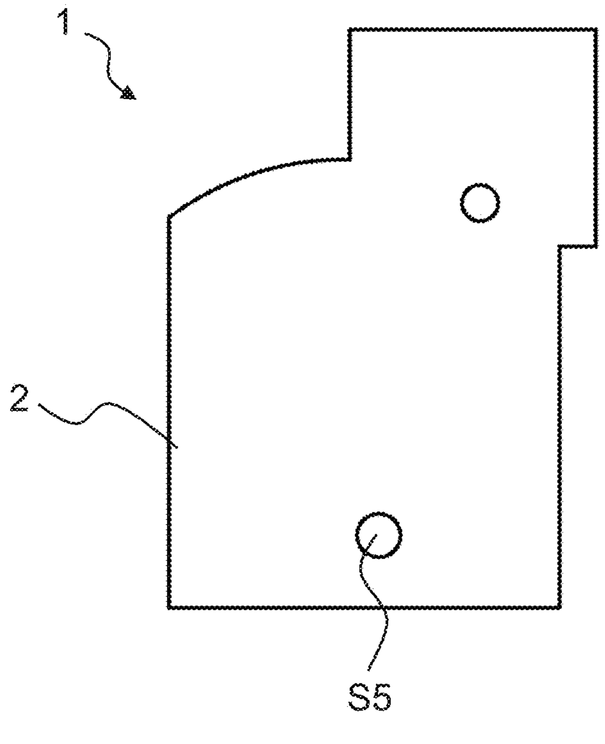
FIG. 20 illustrates a side view of the door opener of FIG. 19 in the open position.

FIG. 20 illustrates a side view of the door opener 1 of FIG. 19 in the open position. Here, the main body 2 with the latch pivot axis S5 is visible. The door opener latch 3 is pivoted towards the backside of the main body 2 in the open position and therefore no longer visible.

Figure 21:
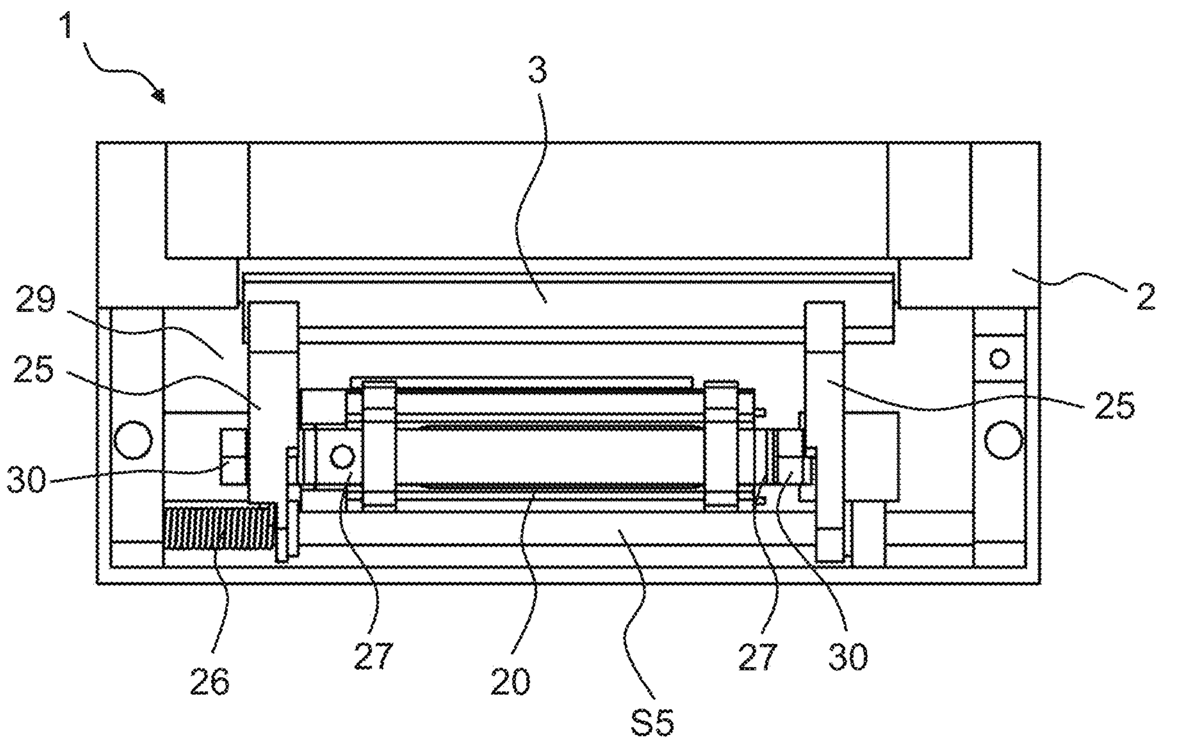
FIG. 21 illustrates a front view of the door opener of FIG. 19 in the open position with blocked door opener latch.

FIG. 21 depicts a front view of the door opener 1 of FIG. 19 in the open position with blocked door opener latch 3. It will be apparent that the blocking members 30 disposed on the slide 27 are displaced linearly (to the left in the Figure). Therefore, the blocking members 30 are positioned laterally adjacent to the pivot range of the associated latch pivot arms 25, such that the latch pivot arms 25 may be freely pivoted—against the force of the latch return spring 26.

Figure 22:
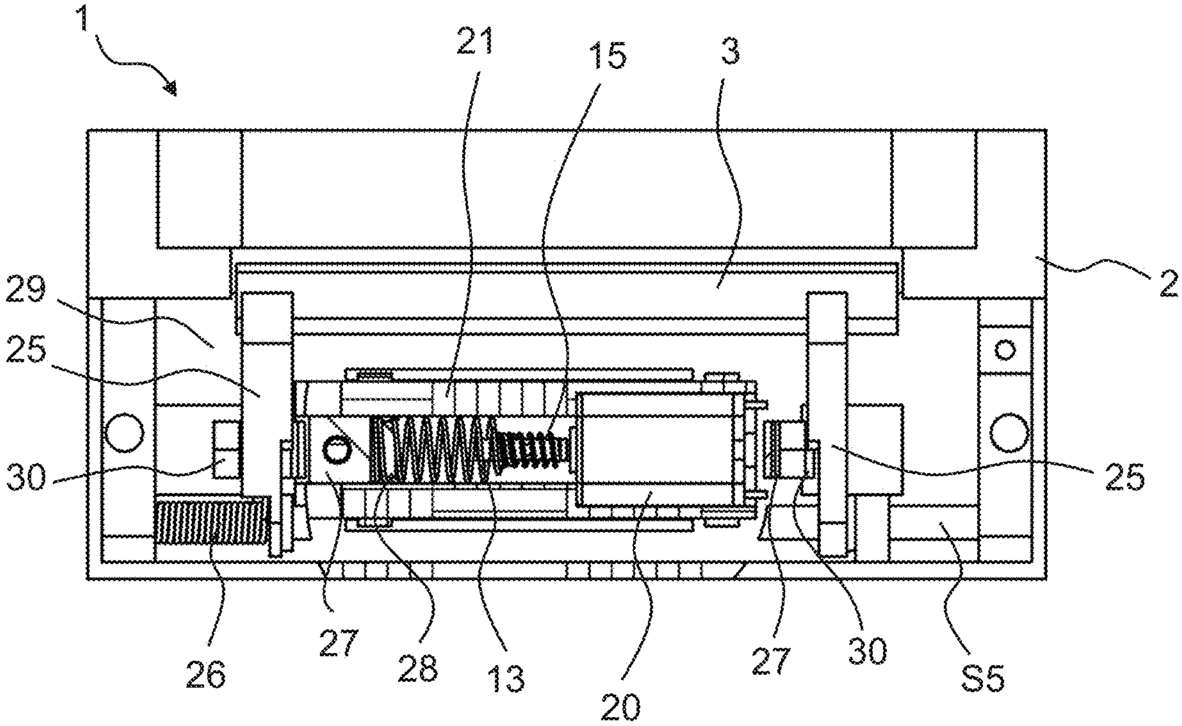
FIG. 22 illustrates a partial sectional front view of the door opener of FIG. 21 in the open position with blocked door opener latch.

FIG. 22 illustrates a partial sectional front view of the door opener 1 of FIG. 21 in the open position with blocked door opener latch 3. For the design of the actuator reference may be made to the embodiments of FIGS. 10 and 17. It will be apparent that the first end portion 14*b* of the actuator spring member 13 on the worm thread 15 is displaced linearly, by its rotation, away from the electric motor along the drive shaft 16. The spring force of the actuator spring member 13 embodied as a compression spring pushes the slide head portion 28 attached at the second end portion 14*a* away from the electric motor and linearly displaces the slide 27, such that the blocking members 30 connected thereto move outside the pivot range of the latch pivot arms 25.

Figure 23:
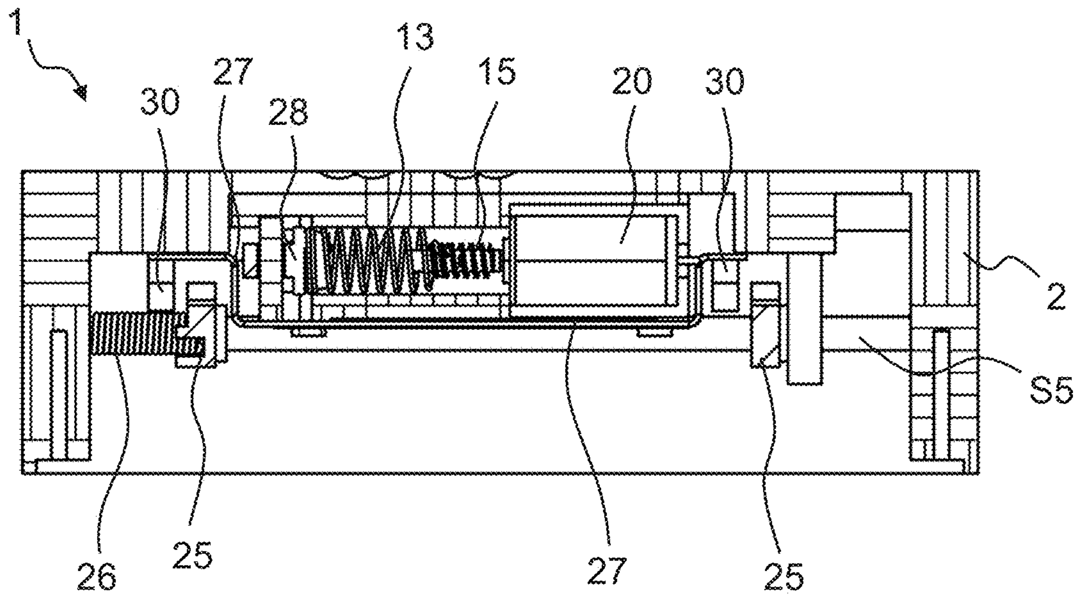
FIG. 23 illustrates a partial sectional top view of the door opener of FIG. 21 in the open position with blocked door opener latch.

FIG. 23 illustrates a partial sectional top view of the door opener 1 of FIG. 21 in the open position with blocked door opener latch 3. Here, reference may essentially be made to the embodiments of FIG. 18. It will be apparent that the blocking members 30 are positioned laterally adjacent to the associated latch pivot arms 25. Here, the latch pivot arms 25 are pivoted into the now cleared pivot range into the open position towards the backside of the main body.

LIST OF REFERENCE NUMERALS

1 door opener
2 main body
3 door opener latch
4 latch lever
5 biasing spring member
6 locking member
7 second biasing spring member
8 plunger
9 groove
11 electric line
12*a*, 12*b* adjusting screws
13 actuator spring member
14*a* second end portion
14*b* first end portion
15 worm thread
16 drive shaft
17 actuation portion/actuation surface
18 cover member
20 actuator
21 actuator housing
22 grooves
23 electric motor
24 guide pin
25 latch pivot axe
26 latch return spring
27 slide
28 slide head portion
29 door sensor
30 blocking member
S1 pivot axis
S2 latch lever axis
S3 pivot axis
S4 axis
S5 pivot axis for latch pivot arm

What is claimed is:

1. A door opener for a door having a wing pivotally mounted to a door frame, said door opener comprising:

a main body;

a door opener latch hingedly mounted in the main body and pivotable between a closed position and an open position;

a blocking member that is mounted in the main body and linearly displaceable from a locking position into a release position and back, the blocking member in its locking position forming a stop for the door opener latch in the closed position to prevent pivoting of the door opener latch into the open position, and the blocking member in its release position being so far offset from the door opener latch that the door opener latch may be pivoted from the closed position to the open position and back without any restriction of movement by the blocking member; and an actuator coupled with the blocking member for releasing or locking the door opener latch, wherein the actuator comprises a motor having a rotatable shaft supporting a worm thread, and a spring member having two end portions is provided, wherein a first end portion of the spring member comprises spring coils that directly engage with the worm thread in order to displace the spring member linearly in the direction of extension of the rotatable shaft by rotating the worm thread, and wherein a second end portion of the spring member is connected to the blocking member in order to displace the blocking member linearly in said direction of extension of the rotatable shaft from the locking position to the release position and back, and wherein the blocking member is decoupled from the actuator by the spring member arranged intermediate between the worm thread and the blocking member, wherein the spring member in the biased state serves as a store of energy with the spring force of the spring member in the biased state acting upon the blocking member to move the blocking member in the release position of the blocking member.

2. The door opener according to claim 1, wherein the actuator comprises a linearly displaceable plunger which is arranged to act upon the blocking member, in order to displace the blocking member from the locking position into the release position when the plunger is moved in the direction of the blocking member, wherein the plunger is connected to the second end portion of the spring member.

3. The door opener according to claim 1, wherein the plunger is guided in a rotationally fixed manner.

4. The door opener according to claim 1, wherein in two end positions, the spring member does not engage with the worm thread and is no longer displaced by the worm thread upon the latter's further rotation.

5. The door opener according to claim 1, wherein in the closed position, the door opener latch protrudes beyond the outline of the main body.

6. The door opener according to claim 1, wherein a door sensor is provided for monitoring the presence of a door lock latch.

7. The door opener according to claim 6, comprising control electronics, wherein the door sensor and the actuator are coupled with the control electronics and in that the control electronics for driving the actuator is configured to transfer the blocking member into the release position in the presence of a door release signal and to bring the blocking member back into the locking position, once the absence of the door lock latch is detected by the door sensor.

* * * * *